(12) United States Patent
Jiang et al.

(10) Patent No.: US 11,895,050 B2
(45) Date of Patent: Feb. 6, 2024

(54) METHOD AND DEVICE IN NODES USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 275 days.

(21) Appl. No.: 17/525,982

(22) Filed: Nov. 15, 2021

(65) Prior Publication Data
US 2022/0166577 A1 May 26, 2022

(30) Foreign Application Priority Data
Nov. 25, 2020 (CN) .......................... 202011339085.8

(51) Int. Cl.
*H04L 5/00* (2006.01)
*H04L 1/08* (2006.01)
*H04W 72/21* (2023.01)

(52) U.S. Cl.
CPC .............. *H04L 5/0048* (2013.01); *H04L 1/08* (2013.01); *H04W 72/21* (2023.01)

(58) Field of Classification Search
None
See application file for complete search history.

(56) References Cited

U.S. PATENT DOCUMENTS

| | | | |
|---|---|---|---|
| 2016/0365097 A1* | 12/2016 | Guan | G10L 19/005 |
| 2019/0007974 A1* | 1/2019 | Nguyen | H04W 4/44 |
| 2019/0044667 A1* | 2/2019 | Guo | H04L 1/1822 |
| 2019/0052436 A1* | 2/2019 | Desai | H04L 5/0055 |
| 2020/0029318 A1* | 1/2020 | Guo | H04L 1/1822 |
| 2022/0166577 A1* | 5/2022 | Jiang | H04W 72/21 |
| 2022/0217679 A1* | 7/2022 | Zhao | H04W 4/70 |
| 2022/0279525 A1* | 9/2022 | Zhao | H04W 72/0453 |

* cited by examiner

*Primary Examiner* — Hassan A Phillips
*Assistant Examiner* — Gautam Sharma

(57) ABSTRACT

The present disclosure provides a method and device in a node used for wireless communications. A node first receives a first signaling and a second signaling; and the first signaling is used to determine a first time-domain resource set, the second signaling is used to determine a second time-domain resource set; and then respectively transmits a first signal and a second signal in a first time-domain resource subset and a second time-domain resource subset; the first time-domain resource subset is associated with a first reference signal resource, and the second signaling is used to indicate a second reference signal resource; the first bit set is used to generate the first signal and the second signal, the second signaling is used to schedule a second bit block. The present disclosure optimizes the system performance by optimizing the transmission methods and devices when the PUCCH collides with the PUSCH.

20 Claims, 5 Drawing Sheets

METHOD AND DEVICE IN NODES USED FOR WIRELESS COMMUNICATION

CROSS REFERENCE TO RELATED APPLICATIONS

This application claims the priority benefit of Chinese Patent Application No. 202011339085.8, filed on Nov. 25, 2020, the full disclosure of which is incorporated herein by reference.

BACKGROUND

Technical Field

The present disclosure relates to transmission methods and devices in wireless communication systems, and in particular to a design scheme and device of uplink feedback in wireless communications.

Related Art

NR Rel-16 standard can already support downlink transmissions of a plurality of Transmit-Receive Points (TRPs) and/or antenna panels, and has supported that one piece of DCI schedules downlink transmissions of a plurality of TRPs and/or antenna panels and a plurality pieces of DCI respectively schedule downlink transmissions of a plurality of TRPs or antenna panels as well.

A work item (WI) of Multiple Input and Multiple Output (MIMO) enhancement of NR Release 17 was approved at 3GPP RAN #86 plenary, where utilizing a plurality of TRPs and/or antenna panels to enhance an uplink channel is a focus of work, such as a Physical Uplink Control CHannel (PUCCH) and a Physical Uplink Shared CHannel (PUSCH); while for enhancement of the PUCCH, one way is to improve robustness of the PUCCH through repetition transmissions.

SUMMARY

Inventors found through researches that there are two main solutions for conflicts between a PUCCH and a PUSCH in the current system; one is when priorities corresponding to the PUCCH and the PUSCH are the same, the PUCCH is piggybacked into the PUSCH; the other is when priorities corresponding to the PUCCH and the PUSCH are different, an uplink signal with a higher priority will be reserved for transmission. In Rel-17 system, intra-slot PUCCH Repetition transmission will be considered to be supported, and when the Intra-Slot PUCCH repetition transmission collides with the PUSCH and a transmitting beam adopted by the PUCCH repetition is completely different from a transmitting beam adopted by the PUSCH, neither dropping the PUSCH nor piggybacking information transmitted by the PUCCH into the PUSCH is a highly efficient way.

To address the above problem, the present disclosure provides a solution. It should be noted that although the above description uses large-scale MIMO and beam-based communication scenarios as examples, the application is also applicable to other scenarios, such as LTE multi-antenna systems, where similar technical effects can be achieved. Additionally, the adoption of a unified solution for various scenarios (including but not limited to large-scale MIMO, beam-based communications and LTE multi-antenna systems) contributes to the reduction of hardware complexity and costs. If no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

In view of the above problems, the present disclosure discloses a method and device for Uplink Control Information (UCI) transmission. It should be noted that the embodiments in a User Equipment (UE) in the present disclosure and characteristics of the embodiments may be applied to a base station if no conflict is incurred, and vice versa. And the embodiments in the present disclosure and the characteristics in the embodiments can be arbitrarily combined if there is no conflict. Though originally targeted at cellular networks, the present disclosure is also applicable to Internet of Things (IoT) and Internet of Vehicles (IoV). Though originally targeted at multi-carrier communications, the present disclosure is also applicable to single-carrier communications. Though originally targeted at multi-antenna communications, the present disclosure is also applicable to single-antenna communications. Besides, the present disclosure is not only for scenarios of terminals and base stations, but also for communication scenarios between terminals and terminals, terminals and relays, Non-Terrestrial Networks as well as relays and base stations, where similar technical effects can be achieved. Additionally, the adoption of a unified solution for various scenarios, including but not limited to communication scenarios between terminals and base stations, contributes to the reduction of hardware complexity and costs.

Further, the embodiments of a first node in the present disclosure and the characteristics of the embodiments may be applied to a second node if no conflict is incurred, and vice versa. Particularly, for interpretations of the terminology, nouns, functions and variants (if not specified) in the present disclosure, refer to definitions given in Technical Specification (TS) 36 series, TS38 series and TS37 series of 3GPP specifications.

The present disclosure provides a method in a first node for wireless communications, comprising:
  receiving a first signaling and a second signaling; and the first signaling being used to determine a first time-domain resource set, the second signaling being used to determine a second time-domain resource set; and
  transmitting a first signal in a first time-domain resource subset, and transmitting a second signal in a second time-domain resource subset;
  herein, the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are Quasi Co-located (QCL) is used to determine whether the second bit block is used to generate the second signal.

In one embodiment, one technical feature of the above method is in: the first time-domain resource set is used to bear Intra-Slot PUCCH repetition transmission, the second time-domain resource set is used to bear PUSCH transmission, when the two collide and if the Intra-Slot PUCCH adopts a plurality of beams for transmission, a PUSCH part adopting same beams as the Intra-Slot PUCCH can be reserved for transmission and used to carry UCI in the PUCCH, while a PUSCH part adopting beams different from the Intra-Slot PUCCH will be dropped.

According to one aspect of the present disclosure, when the first reference signal resource and the second reference signal resource are QCL, the second bit block is used to generate the second signal; and when the first reference signal resource and the second reference signal resource are not QCL, the second bit block is not used to generate the second signal.

According to one aspect of the present disclosure, the first time-domain resource set comprises K1 first-type time-domain resource subsets, the second time-domain resource set comprises K2 first-type time-domain resource subsets, and there are a total of K3 first-type time-domain resource subsets in the K1 first-type time-domain resource subsets and the K2 first-type time-domain resource subsets being overlapped; the first time-domain resource subset and the second time-domain resource subset are respectively two different first-type time-domain resource subsets in the K3 first-type time-domain resource subsets; K1, K2 and K3 are positive integers greater than 1.

According to one aspect of the present disclosure, the K1 first-type time-domain resource subsets are respectively reserved for K1 PUCCH repetition transmissions, and the first bit set is used to generate the K1 PUCCHs; the first signal is one PUCCH transmission in the K1 PUCCH repetition transmissions.

According to one aspect of the present disclosure, when the first reference signal resource and the second reference signal resource are QCL, a physical layer channel bearing the second signal is a PUSCH, and an information bit carried by the first bit set is carried in the PUSCH; when the first reference signal resource and the second reference signal resource are not QCL, the second signal is one PUCCH transmission in the K1 PUCCH repetition transmissions.

In one embodiment, one technical feature of the above method is in: when beams adopted by a PUSCH are different from a plurality of beams adopted by an Intra-Slot PUCCH, the whole PUSCH will be dropped to ensure the transmission performance of the PUCCH.

According to one aspect of the present disclosure, comprising:
dropping transmitting a bit comprised in the second bit block in the first time-domain resource subset.

According to one aspect of the present disclosure, comprising:
receiving a third signal; and
herein, the first signaling comprises a configuration information set of the third signal, and the first bit set comprises a feedback for the third signal.

According to an aspect of the present disclosure, the first signaling comprises a first sub-signaling and a second sub-signaling, time-frequency resources occupied by the first sub-signaling belong to a first time-frequency resource set, time-frequency resources occupied by the second sub-signaling belong to a second time-frequency resource set, and the first time-frequency resource set and the second time-frequency resource set are respectively associated with a first candidate reference signal resource and a second candidate reference signal resource; time-frequency resources occupied by the second signaling belong to a third time-frequency resource set, and the third time-frequency resource set is associated with one of the first candidate reference signal resource or the second candidate reference signal resource.

According to an aspect of the present disclosure, the K2 first-type time-domain resource subsets are reserved for transmitting K2 CBGs, and when the first reference signal resource and the second reference signal resource are QCL, one of the K2 CBGs is used to generate the second signal.

In one embodiment, one technical feature of the above method is in: when the PUSCH is used to carry UCI in the PUCCH, and since the PUSCH part in the first time-domain resource subset cannot be transmitted, the reserved PUSCH is reserved in CBG to reduce complexity and facilitate retransmission of a PUSCH part that is not transmitted.

The present disclosure provides a method in a second node for wireless communications, comprising:
transmitting a first signaling and a second signaling; the first signaling being used to determine a first time-domain resource set, the second signaling being used to determine a second time-domain resource set; and
receiving a first signal in a first time-domain resource subset, and receiving a second signal in a second time-domain resource subset;
herein, the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are QCL is used to determine whether the second bit block is used to generate the second signal.

According to one aspect of the present disclosure, when the first reference signal resource and the second reference signal resource are QCL, the second bit block is used to generate the second signal; and when the first reference signal resource and the second reference signal resource are not QCL, the second bit block is not used to generate the second signal.

According to one aspect of the present disclosure, the first time-domain resource set comprises K1 first-type time-domain resource subsets, the second time-domain resource set comprises K2 first-type time-domain resource subsets, and there are a total of K3 first-type time-domain resource subsets in the K1 first-type time-domain resource subsets and the K2 first-type time-domain resource subsets being overlapped; the first time-domain resource subset and the second time-domain resource subset are respectively two different first-type time-domain resource subsets in the K3 first-type time-domain resource subsets; K1, K2 and K3 are positive integers greater than 1.

According to one aspect of the present disclosure, the K1 first-type time-domain resource subsets are respectively reserved for K1 PUCCH repetition transmissions, and the first bit set is used to generate the K1 PUCCHs; the first signal is one PUCCH transmission in the K1 PUCCH repetition transmissions.

According to one aspect of the present disclosure, when the first reference signal resource and the second reference signal resource are QCL, a physical layer channel bearing the second signal is a PUSCH, and an information bit carried by the first bit set is carried in the PUSCH; when the first reference signal resource and the second reference signal resource are not QCL, the second signal is one PUCCH transmission in the K1 PUCCH repetition transmissions.

According to one aspect of the present disclosure, comprising:

transmitting a third signal;
herein, the first signaling comprises a configuration information set of the third signal, and the first bit set comprises a feedback for the third signal.

According to one aspect of the present disclosure, comprising:

dropping receiving a bit comprised in the second bit block in the first time-domain resource subset.

According to an aspect of the present disclosure, the first signaling comprises a first sub-signaling and a second sub-signaling, time-frequency resources occupied by the first sub-signaling belong to a first time-frequency resource set, time-frequency resources occupied by the second sub-signaling belong to a second time-frequency resource set, and the first time-frequency resource set and the second time-frequency resource set are respectively associated with a first candidate reference signal resource and a second candidate reference signal resource; time-frequency resources occupied by the second signaling belong to a third time-frequency resource set, and the third time-frequency resource set is associated with one of the first candidate reference signal resource or the second candidate reference signal resource.

According to an aspect of the present disclosure, the K2 first-type time-domain resource subsets are reserved for transmitting K2 CBGs, and when the first reference signal resource and the second reference signal resource are QCL, one of the K2 CBGs is used to generate the second signal.

The present disclosure provides a first node for wireless communications, comprising:

a first receiver, receiving a first signaling and a second signaling; the first signaling being used to determine a first time-domain resource set, the second signaling being used to determine a second time-domain resource set; and
a first transmitter, transmitting a first signal in a first time-domain resource subset, and transmitting a second signal in a second time-domain resource subset;
herein, the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are QCL is used to determine whether the second bit block is used to generate the second signal.

The present disclosure provides a second node for wireless communications, comprising:

a second transmitter, transmitting a first signaling and a second signaling; the first signaling being used to determine a first time-domain resource set, the second signaling being used to determine a second time-domain resource set; and
a second receiver, receiving a first signal in a first time-domain resource subset, and receiving a second signal in a second time-domain resource subset;
herein, the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are QCL is used to determine whether the second bit block is used to generate the second signal.

In one embodiment, the present disclosure has the following advantages over conventional schemes:

the first time-domain resource set is used to bear Intra-Slot PUCCH repetition transmission, the second time-domain resource set is used to bear PUSCH transmission, when the two collide and if the Intra-Slot PUCCH adopts a plurality of beams for transmission, a PUSCH part adopting same beams as the Intra-Slot PUCCH can be reserved for transmission and used to carry UCI in the PUCCH, while a PUSCH part adopting beams different from the Intra-Slot PUCCH will be dropped;
the above method ensures that when the PUSCH and the PUCCH have same transmitting beams, transmission of part of the PUSCH is reserved, which avoids the spectrum efficiency decline incurred by the whole PUSCH being dropped.
when the PUSCH is used to carry UCI in the PUCCH, and since the PUSCH part in the first time-domain resource subset cannot be transmitted, the reserved PUSCH is reserved in CBG to reduce complexity and facilitate retransmission of a PUSCH part that is not transmitted.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
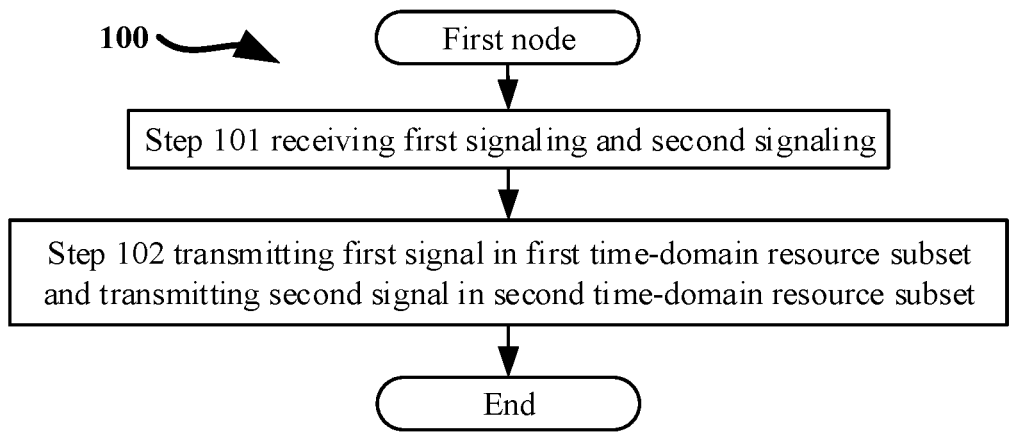
FIG. 1 illustrates a flowchart of the processing of a first node according to one embodiment of the present disclosure.

Embodiment 1 illustrates a processing flowchart of a first node, as shown in FIG. 1. In step 100 illustrated by FIG. 1, each box represents a step. In Embodiment 1, a first node in the present disclosure receives a first signaling and a second signaling in step S101; transmits a first signal in a first time-domain resource subset in step 102, and transmits a second signal in a second time-domain resource subset.

In embodiment 1, the first signaling is used to determine a first time-domain resource set, the second signaling is used to determine a second time-domain resource set; and the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are QCL is used to determine whether the second bit block is used to generate the second signal.

In one embodiment, the first signal is a radio signal.

In one embodiment, the first signal is a baseband signal.

In one embodiment, the second signal is a radio signal.

In one embodiment, the second signal is a baseband signal.

In one embodiment, the first signaling comprises a physical layer signaling.

In one embodiment, the first signaling comprises a higher-layer signaling.

In one embodiment, the first signaling comprises a Radio Resource Control (RRC) signaling.

In one embodiment, a physical layer channel bearing the first signaling comprises a Physical Downlink Control Channel (PDCCH).

In one embodiment, a physical layer channel bearing the first signaling comprises a Physical Sidelink Control Channel (PSCCH).

In one embodiment, the first signaling is a piece of Downlink Control Information (DCI).

In one embodiment, the first signaling is a piece of Sidelink Control Information (SCI).

In one embodiment, the first signaling is a downlink grant.

In one embodiment, the first signaling is an uplink grant.

In one embodiment, the second signaling comprises a physical layer signaling.

In one embodiment, the second signaling comprises a higher-layer signaling.

In one embodiment, the second signaling comprises an RRC signaling.

In one embodiment, a physical layer channel bearing the second signaling comprises a PDCCH.

In one embodiment, a physical layer channel bearing the second signaling comprises a PSCCH.

In one embodiment, the second signaling is a piece of DCI.

In one embodiment, the second signaling is a piece of SCI.

In one embodiment, the second signaling is a downlink grant.

In one embodiment, the second signaling is an uplink grant.

In one embodiment, the first signaling is used to indicate a position of time-domain resources occupied by the first time-domain resource set.

In one embodiment, the second signaling is used to indicate a position of time-domain resources occupied by the second time-domain resource set.

In one embodiment, the first time-domain resource set occupies a slot in time domain.

In one embodiment, the first time-domain resource set occupies a plurality of slots in time domain.

In one embodiment, the second time-domain resource set occupies a slot in time domain.

In one embodiment, the second time-domain resource set occupies a plurality of slots in time domain.

In one embodiment, the first time-domain resource subset occupies a slot in time domain.

In one embodiment, the first time-domain resource subset occupies a sub-slot in time domain.

In one embodiment, the first time-domain resource subset occupies a mini-slot in time domain.

In one embodiment, the first time-domain resource subset occupies W1 consecutive OFDM symbol(s) in time domain, W1 being a positive integer not greater than 7.

In one embodiment, the second time-domain resource subset occupies a slot in time domain.

In one embodiment, the second time-domain resource subset occupies a sub-slot in time domain.

In one embodiment, the second time-domain resource subset occupies a mini-slot in time domain.

In one embodiment, the second time-domain resource subset occupies W1 consecutive OFDM symbol(s) in time domain, W1 being a positive integer not greater than 7.

In one embodiment, a physical layer channel bearing the first signal comprises a Physical Uplink Control Channel (PUCCH).

In one embodiment, the first signal is one transmission in a plurality of PUCCH repetition transmissions.

In one embodiment, when the second bit block is used to generate the second signal, a physical layer signal bearing the second signal comprises a PUSCH.

In one subembodiment of the embodiment, the second signal is a Physical Uplink Shared Channel (PUSCH) transmission.

In one subembodiment of the embodiment, the second signal is one transmission in a plurality of PUSCH repetition transmissions.

In one embodiment, when the second bit block is not used to generate the second signal, a physical layer signal bearing the second signal comprises a PUCCH.

In one subembodiment of the embodiment, the second signal is one transmission in a plurality of PUCCH repetition transmissions.

In one embodiment, the above phrase of "the first time-domain resource subset being orthogonal to the second time-domain resource subset in time domain" includes: there does not exist an OFDM symbol belonging to time-domain resources occupied by the first time-domain resource subset and time-domain resources occupied by the first time-domain resource subset at the same time.

In one embodiment, the above phrase of "the first time-domain resource subset being orthogonal to the second time-domain resource subset in time domain" includes: time-domain resources occupied by the first time-domain resource subset and time-domain resources occupied by the first time-domain resource subset are not overlapped.

In one embodiment, the first bit set comprises Q1 bits, Q1 being a positive integer greater than 1.

In one embodiment, the first bit set comprises 1 bit.

In one embodiment, the first bit set is used to carry Uplink Control Information (UCI).

In one embodiment, the first bit set is used to generate a piece of UCI.

In one embodiment, a bit comprised in the first bit set is an information bit carried by a piece of UCI.

In one subembodiment of the above three embodiments, the UCI comprises a Hybrid Automatic Repeat reQuest Acknowledgement (HARQ-ACK).

In one subembodiment of the above three embodiments, the UCI comprises Channel State Information (CSI).

In one subembodiment of the above three embodiments, the UCI comprises an information bit used for carrying at least one of Channel Quality Information (CQI), a Precoding Matrix Indicator (PMI), a CSI-RS Resource Indicator (CRI), an SS/PBCH Resource Block Indicator (SSBRI), a Layer Indicator (LI), a Rank Indicator (RI), a Precoding Type Indicator (PTI), Reference Signal Received Power (RSRP), Reference Signal Received Quality (RSRQ), or a Signal-to-noise and interference ratio (SINR).

In one embodiment, the above phrase of "the first time-domain resource set being reserved for transmitting a first bit set" includes: the first signaling is used to indicate that the first bit set is transmitted in the first time-domain resource set.

In one embodiment, the above phrase of "the first time-domain resource set being reserved for transmitting a first bit set" includes: the first signaling is used to trigger that the first bit set is transmitted in the first time-domain resource set.

In one embodiment, the above phrase of "the first time-domain resource set being reserved for transmitting a first bit set" includes: when the first time-domain resource set is not used to transmit a signal with a priority higher than the first bit set, the first node transmits the first bit set in the first time-domain resource set.

In one embodiment, the above phrase of "the first time-domain resource set being reserved for transmitting a first bit set" includes: when there exists no transmission of other signals colliding with the first bit set in the first time-domain resource set, the first node transmits the first bit set in the first time-domain resource set.

In one embodiment, the above phrase of "the first bit set being used to generate the first signal" includes: the first signal is used to transmit an information bit carried by the first bit set.

In one embodiment, the above phrase of "the first bit set being used to generate the first signal" includes: the first bit set is used to generate a control information bit carried by the first signal.

In one embodiment, the above phrase of "the first bit set being used to generate the first signal" includes: the first bit set is used to generate a data bit carried by the first signal.

In one embodiment, the above phrase of "the first bit set being used to generate the first signal" includes: the first bit set is used to generate a check bit carried by the first signal.

In one embodiment, the above phrase of "the first bit set being used to generate the second signal" includes: the second signal is used to transmit a control information bit carried by the first bit set.

In one embodiment, the above phrase of "the first bit set being used to generate the second signal" includes: the first bit set is used to generate a control information bit carried by the second signal.

In one embodiment, the above phrase of "the first bit set being used to generate the second signal" includes: the first bit set is used to generate a check bit carried by the second signal.

In one embodiment, the second bit block is a Transport Block (TB).

In one embodiment, the second bit block is a Codeblock Group (CBG).

In one embodiment, the second bit block occupies a HARQ process number.

In one embodiment, a physical layer channel bearing a radio signal generated by the second bit block comprises a PUSCH.

In one embodiment, the above phrase of "the second signal being used to schedule a second bit block" includes: a transmission channel bearing the second bit block is a UL-SCH, and the second signal is used to indicate at least one of time-domain resources or frequency-domain resources occupied by a radio signal generated by the second bit block.

In one embodiment, the above phrase of "the second signal being used to schedule a second bit block" includes: the second bit block is used to generate a PUSCH, and the second signaling schedules the PUSCH.

In one embodiment, the first reference signal resource is associated with a Transmission Configuration Indication State (TCI-State).

In one embodiment, the first reference signal resource is associated with a Transmission Configuration Indication State Identity (TCI-StateId).

In one embodiment, the first reference signal resource is associated with a SRS Resource Indicator (SRI).

In one embodiment, the first reference signal resource comprises Channel-State Information Reference Signals (CSI-RS) resources.

In one embodiment, the first reference signal resource comprises an SS/PBCH Block (SSB).

In one embodiment, the first reference signal resource comprises a Sounding Reference Signal (SRS).

In one embodiment, the first reference signal resource is associated with a CSI-RS resource identity.

In one embodiment, the first reference signal resource is indexed by an associated SSB.

In one embodiment, the second reference signal resource is associated with a TCI-State.

In one embodiment, the second reference signal resource is associated with a TCI-StateId.

In one embodiment, the second reference signal resource is associated with an SRI.

In one embodiment, the second reference signal resource comprises a CSI-RS resource.

In one embodiment, the second reference signal resource comprises an SSB.

In one embodiment, the second reference signal resource comprises an SRS.

In one embodiment, the second reference signal resource is associated with a CSI-RS resource identity.

In one embodiment, the second reference signal resource is indexed by an associated SSB.

In one embodiment, the above phrase of "the first time-domain resource subset being associated with a first reference signal resource" includes: a radio signal transmitted by the first node in the first time-domain resource subset and the first reference signal resource are QCL.

In one embodiment, the above phrase of "the first time-domain resource subset being associated with a first reference signal resource" includes: a radio signal received by the first node in the first time-domain resource subset and the first reference signal resource are QCL.

In one embodiment, the above phrase of "the first time-domain resource subset being associated with a first reference signal resource" includes: a spatial reception parameter adopted by a radio signal received in the first reference signal resource is used to determine a spatial transmission parameter adopted by a radio signal transmitted by the first node in the first time-domain resource subset.

In one embodiment, the above phrase of "the first time-domain resource subset being associated with a first reference signal resource" includes: a spatial transmission parameter adopted by a radio signal transmitted in the first reference signal resource is used to determine a spatial transmission parameter adopted by a radio signal transmitted by the first node in the first time-domain resource subset.

In one embodiment, the second signaling comprises a first field, and the first field is used to indicate the second reference signal resource.

In one subembodiment of the embodiment, the second reference signal resource is used to determine a spatial transmission parameter of a radio signal scheduled by the second signaling.

In one subembodiment of the embodiment, the second reference signal resource is used to determine a spatial reception parameter of a radio signal scheduled by the second signaling.

In one embodiment, a priority corresponding to the first signal is the same as a priority corresponding to the second signal.

In one embodiment, the first signal and the second signal are both used for Ultra Reliable and Low Latency Communication (URLLC) transmission.

In one embodiment, the first signal and the second signal are both used for Enhanced Mobile Broadband (eMBB) transmission.

In one embodiment, time-domain resources occupied by the first signaling are earlier than time-domain resources occupied by the second signaling.

In one embodiment, time-domain resources occupied by the first signaling are later than time-domain resources occupied by the second signaling.

Embodiment 2

Figure 2:
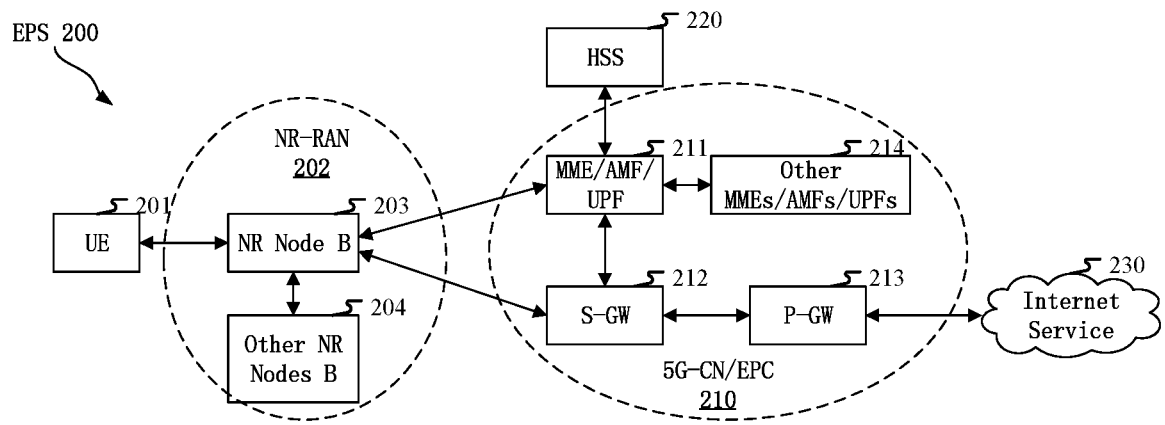
FIG. 2 illustrates a schematic diagram of a network architecture according to one embodiment of the present disclosure.

Embodiment 2 illustrates a schematic diagram of a network architecture, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 is a terminal capable of simultaneously supporting services with different delay requirements.

In one embodiment, the UE 201 is a terminal capable of simultaneously supporting eMBB and URLLC services.

In one embodiment, the UE 201 is a terminal capable of simultaneously supporting inter-slot PUCCH repetition transmission and intra-slot PUCCH repetition transmission.

In one embodiment, the UE 201 is a terminal that supports an uplink adopting Multi-TRP transmission mode.

In one embodiment, the gNB 203 corresponds to the second node in the present disclosure.

In one embodiment, the gNB 203 is a base station capable of simultaneously supporting services with different delay requirements.

In one embodiment, the gNB 203 is a base station capable of simultaneously supporting eMBB and URLLC services.

In one embodiment, the gNB 203 is a base station capable of simultaneously supporting inter-reception slot PUCCH repetition transmission and intra-reception slot PUCCH repetition transmission.

In one embodiment, the gNB 203 is a base station that supports an uplink adopting Multi-TRP transmission mode.

Embodiment 3

Figure 3:
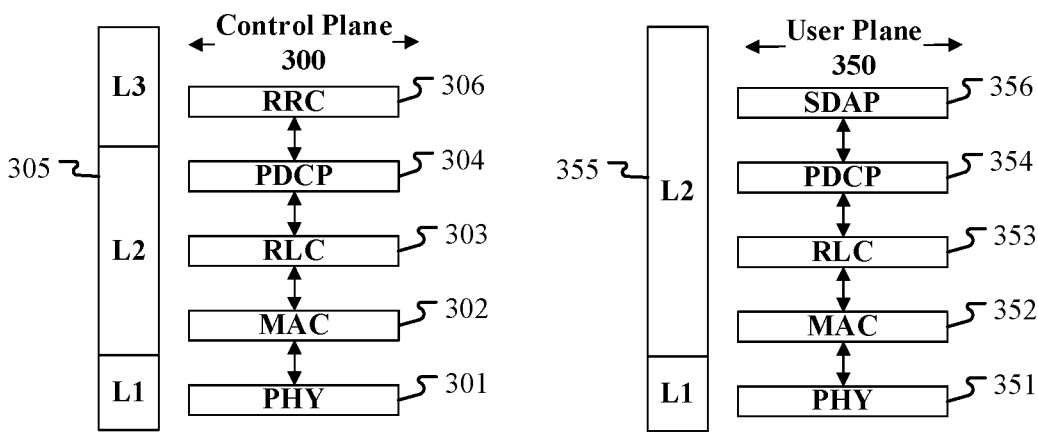
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or RSU in V2X) and a second communication node (gNB, UE or RSU in V2X) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first communication node and the second communication node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and also provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP 304 of the second communication node is used to generate scheduling of the first communication node.

In one embodiment, the PDCP 354 of the second communication node is used to generate scheduling of the first communication node.

In one embodiment, the first signaling in the present disclosure is generated by the PHY 301 or the PHY 351.

In one embodiment, the first signaling in the present disclosure is generated by the MAC 302 or the MAC 352.

In one embodiment, the first signaling in the present disclosure is generated by the RRC 306.

In one embodiment, the second signaling in the present disclosure is generated by the PHY 301 or the PHY 351.

In one embodiment, the second signaling in the present disclosure is generated by the MAC 302 or the MAC 352.

In one embodiment, the second signaling in the present disclosure is generated by the RRC 306.

In one embodiment, the first signal in the present disclosure is generated by the PHY 301 or the PHY 351.

In one embodiment, the first signal in the present disclosure is generated by the MAC 302 or the MAC 352.

In one embodiment, the first signal in the present disclosure is generated by the RRC 306.

In one embodiment, the second signal in the present disclosure is generated by the PHY 301 or the PHY 351.

In one embodiment, the second signal in the present disclosure is generated by the MAC 302 or the MAC 352.

In one embodiment, the second signal in the present disclosure is generated by the RRC 306.

In one embodiment, the third signal in the present disclosure is generated by the PHY 301 or the PHY 351.

In one embodiment, the third signal in the present disclosure is generated by the MAC 302 or the MAC 352.

In one embodiment, the first node is a terminal.

In one embodiment, the second node is a terminal.

In one embodiment, the second node is a Road Side Unit (RSU).

In one embodiment, the second node is a Grouphead.

In one embodiment, the second node is a Transmitter Receiver Point (TRP).

In one embodiment, the second node is a cell.

In one embodiment, the second node is an eNB.

In one embodiment, the second node is a base station.

In one embodiment, the second node is used to manage a plurality of base stations.

In one embodiment, the second node is a node for managing a plurality of cells.

In one embodiment, the second node is used to manage a plurality of TRPs.

Embodiment 4

Figure 4:
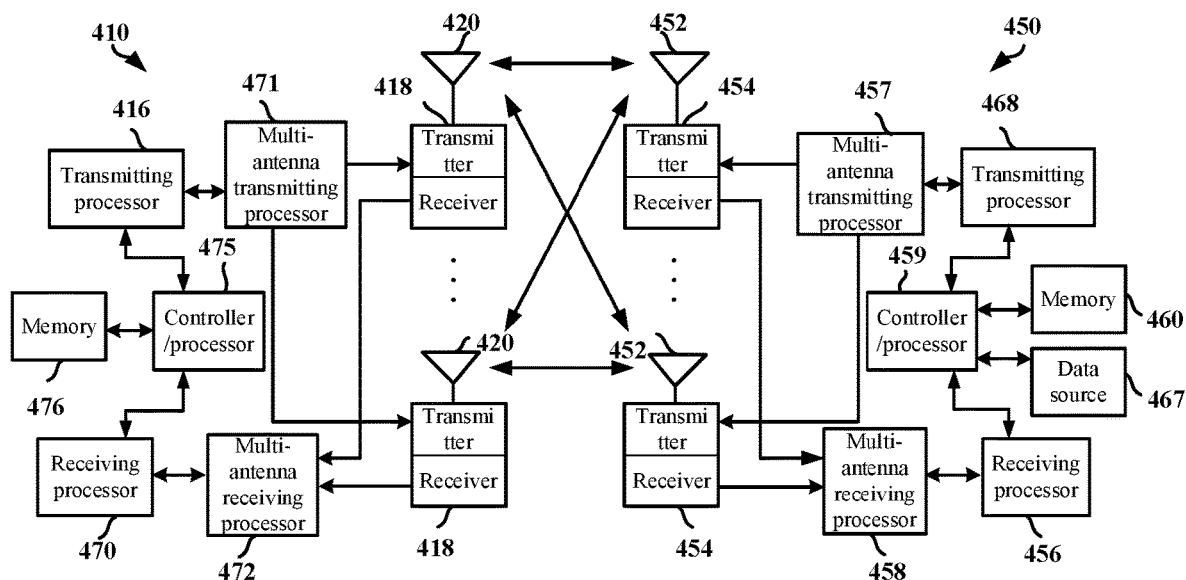
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The UE 450 at least: receives a first signaling and a second signaling; and the first signaling is used to determine a first time-domain resource set, the second signaling is used to determine a second time-domain resource set; and transmits a first signal in a first time-domain resource subset, and transmits a second signal in a second time-domain resource subset; the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are QCL is used to determine whether the second bit block is used to generate the second signal.

In one embodiment, the first communication device 450 comprises at least one processor and at least one memory. a memory that stores a computer readable instruction program. The computer readable instruction program generates an action when executed by at least one processor. The action includes: receiving a first signaling and a second signaling; and the first signaling being used to determine a first time-domain resource set, the second signaling being used to determine a second time-domain resource set; and transmitting a first signal in a first time-domain resource subset, and transmitting a second signal in a second time-domain resource subset; the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are QCL is used to determine whether the second bit block is used to generate the second signal.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first signaling and a second signaling; the first signaling is used to determine a first time-domain resource set, the second signaling is used to determine a second time-domain resource set; and receives a first signal in a first time-domain resource subset, and receives a second signal in a second time-domain resource subset; the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are QCL is used to determine whether the second bit block is used to generate the second signal.

In one embodiment, the second communication device 410 comprises a memory that stores a computer readable instruction program. The computer readable instruction program generates an action when executed by at least one processor. The action includes: transmitting a first signaling and a second signaling; the first signaling being used to determine a first time-domain resource set, the second signaling being used to determine a second time-domain resource set; and receiving a first signal in a first time-domain resource subset, and receiving a second signal in a second time-domain resource subset; the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are QCL is used to determine whether the second bit block is used to generate the second signal.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the first communication device 450 is a terminal.

In one embodiment, the second communication device 410 is a base station.

In one embodiment, the second communication device 410 is a UE.

In one embodiment, the second communication device 410 is a network device.

In one embodiment, the second communication device 410 is a serving cell.

In one embodiment, the second communication device 410 is a TRP.

In one embodiment, at least first four of the antenna 452, the receiver 454, the multi-antenna receiving processor 458, the receiving processor 456 and the controller/processor 459 are used to receive a first signaling and a second signaling; at least first four of the antenna 420, the transmitter 418, the multi-antenna transmitting processor 471, the transmitting processor 416 and the controller/processor 475 are used to transmit a first signaling and a second signaling.

In one embodiment, at least first four of the antenna 452, the transmitter, the multi-antenna transmitting processor 457, the transmitting processor 468, and the controller/processor 459 are used to transmit a first signal in a first time-domain resource subset and a second signal in a second time-domain resource subset; at least first four of the antenna 420, the receiver 418, the multi-antenna receiving processor 472, the receiving processor 470 and the controller/processor 475 are used to receive a first signal in a first time-domain resource subset and a second signal in a second time-domain resource subset.

In one embodiment, at least first four of the antenna 452, the receiver 454, the multi-antenna receiving processor 458, the receiving processor 456 and the controller/processor 459 are used to receive a third signal; at least first four of the antenna 420, the transmitter 418, the multi-antenna transmitting processor 471, the transmitting processor 416 and the controller/processor 475 are used to transmit a third signal.

Embodiment 5

Figure 5:
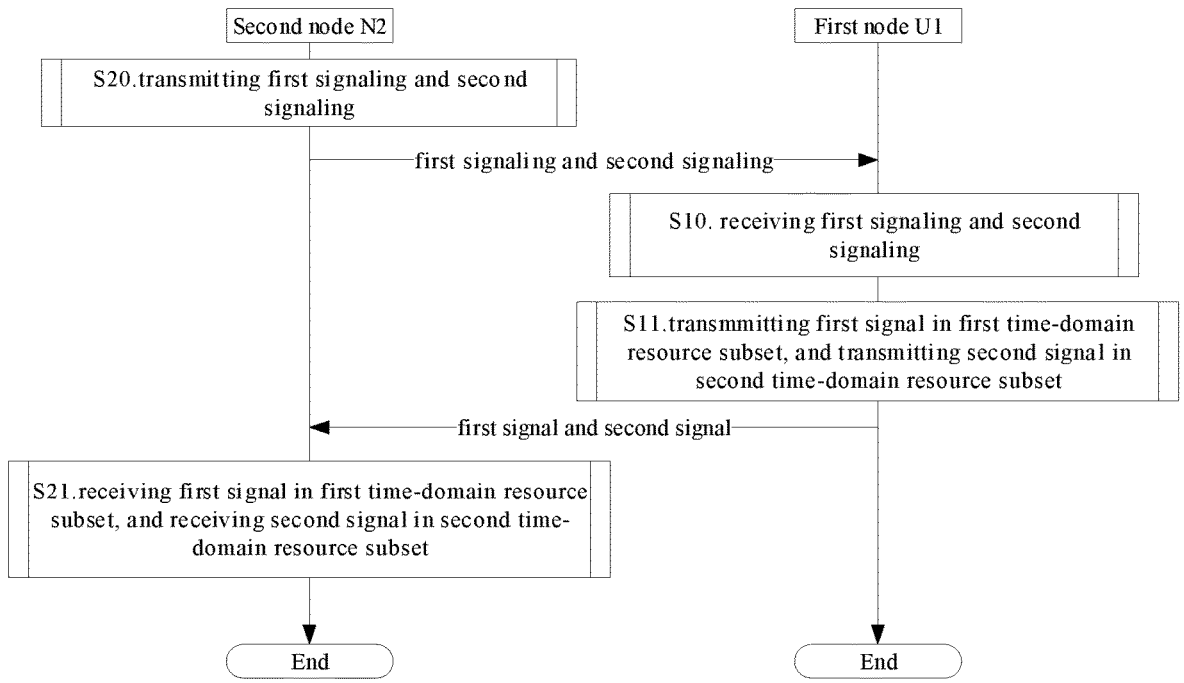
FIG. 5 illustrates a flowchart of a first signaling and a second signaling according to one embodiment of the present disclosure.

Embodiment 5 illustrates a flowchart of a first signaling and a second signaling, as shown in FIG. 5. In FIG. 5, a first node U1 and a second node N2 are in communications via a radio link. It is particularly underlined that the order illustrated in the embodiment does not put constraints over sequences of signal transmissions and implementations.

The first node U1 receives a first signaling and a second signaling in step S10; transmits a first signal in a first time-domain resource subset in step S11, and transmits a second signal in a second time-domain resource subset.

The second node N2 transmits a first signaling and a second signaling in step S20; receives a first signal in a first time-domain resource subset in step S21, and receives a second signal in a second time-domain resource subset.

In embodiment 5, the first signaling being used to determine a first time-domain resource set, the second signaling being used to determine a second time-domain resource set; and the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are QCL is used to determine whether the second bit block is used to generate the second signal.

In one embodiment, when the first reference signal resource and the second reference signal resource are QCL, the second bit block is used to generate the second signal; and when the first reference signal resource and the second reference signal resource are not QCL, the second bit block is not used to generate the second signal.

In one subembodiment of the embodiment, when the first reference signal resource and the second reference signal resource are QCL, the second bit block and the first bit set are used to generate the second signal at the same time.

In one subsidiary embodiment of the subembodiment, a physical layer channel bearing the second signal comprises a PUSCH.

In one subembodiment of the embodiment, when the first reference signal resource and the second reference signal resource are not QCL, only the first bit set in the second bit block and the first bit set is used to generate the second signal.

In one subsidiary embodiment of the subembodiment, a physical layer channel bearing the second signal comprises a PUCCH.

In one subembodiment of the embodiment, when the first reference signal resource and the second reference signal resource are QCL, the second bit block is transmitted in only the second time-domain resource subset in the first time-domain resource subset and the second time-domain resource subset.

In one subembodiment of the embodiment, when the first reference signal resource and the second reference signal resource are not QCL, the first node U1 drops transmitting the second bit block in the second time-domain resource set.

In one subembodiment of the embodiment, when the first reference signal resource and the second reference signal resource are not QCL, the first node U1 drops transmitting partial or all bits comprised in the second bit block in the second time-domain resource set.

In one subembodiment of the above embodiment, only the first bit set in the first bit set and the second bit block is used to generate the first signal.

In one subembodiment of the embodiment, the first signal is unrelated to the second bit block.

In one subembodiment of the embodiment, when the first reference signal resource and the second reference signal resource are QCL, the second signaling is used to indicate frequency-domain resources occupied by the second signal.

In one subembodiment of the embodiment, when the first reference signal resource and the second reference signal resource are not QCL, the first signaling is used to determine frequency-domain resources occupied by the second signal.

In one embodiment, the first node U1 comprises: dropping transmitting the second bit block in the first time-domain resource subset.

In one embodiment, the second node N2 comprises: dropping receiving the second bit block in the first time-domain resource subset.

In one embodiment, the first time-domain resource set comprises K1 first-type time-domain resource subsets, the second time-domain resource set comprises K2 first-type time-domain resource subsets, and there are a total of K3 first-type time-domain resource subsets in the K1 first-type time-domain resource subsets and the K2 first-type time-domain resource subsets being overlapped; the first time-domain resource subset and the second time-domain resource subset are respectively two different first-type time-domain resource subsets in the K3 first-type time-domain resource subsets; K1, K2 and K3 are positive integers greater than 1.

In one subembodiment of the above embodiment, the K1 first-type time-domain resource subsets are K1 consecutive slots.

In one subembodiment of the above embodiment, the K1 first-type time-domain resource subsets are K1 consecutive sub-slots.

In one subembodiment of the above embodiment, the K1 first-type time-domain resource subsets are K1 consecutive mini-slots.

In one subembodiment of the above embodiment, the K2 first-type time-domain resource subsets are K2 consecutive slots.

In one subembodiment of the above embodiment, the K2 first-type time-domain resource subsets are K2 consecutive sub-slots.

In one subembodiment of the above embodiment, the K2 first-type time-domain resource subsets are K2 consecutive mini-slots.

In one subembodiment of the above embodiment, the first-type time-domain resource subset in the present disclosure is a slot.

In one subembodiment of the above embodiment, the first-type time-domain resource subset in the present disclosure is a sub-slot.

In one subembodiment of the above embodiment, the first-type time-domain resource subset in the present disclosure is a mini-slot.

In one subembodiment of the above embodiment, numbers of OFDM symbols occupied by at least two first-type time-domain resource subsets in the K1 first-type time-domain resource subsets are different.

In one subembodiment of the above embodiment, numbers of OFDM symbols occupied by at least two first-type time-domain resource subsets in the K2 first-type time-domain resource subsets are different.

In one subembodiment of the embodiment, a sub-slot in the present disclosure occupies consecutive T1 OFDM symbol(s) in time domain, T1 being equal to one of 1, 2, 4, or 7.

In one subembodiment of the embodiment, a mini-slot in the present disclosure occupies consecutive T2 OFDM symbol(s) in time domain, T2 being equal to one of 1, 2, 4, or 7.

In one embodiment, the K1 first-type time-domain resource subsets are respectively reserved for K1 PUCCH repetition transmissions, and the first bit set is used to generate the K1 PUCCHs; the first signal is one PUCCH transmission in the K1 PUCCH repetition transmissions.

In one subembodiment of the embodiment, the K1 PUUCCH repetition transmissions are used to bear a transmission of a piece of UCI.

In one subembodiment of the embodiment, at least two PUCCHs in the K1 PUCCH repetition transmissions are respectively associated with two non-QCL reference signal resources.

In one subembodiment of the embodiment, there at least exist two PUCCHs in the K1 PUCCH repetition transmissions respectively adopting two different spatial transmission parameters for transmission.

In one subembodiment of the embodiment, there at least exist two PUCCHs in the K1 PUCCH repetition transmissions respectively adopting two different beams for transmission.

In one embodiment, when the first reference signal resource and the second reference signal resource are QCL, a physical layer channel bearing the second signal is a PUSCH, and an information bit carried by the first bit set is carried in the PUSCH; when the first reference signal resource and the second reference signal resource are not QCL, the second signal is one PUCCH transmission in the K1 PUCCH repetition transmissions.

In one embodiment, the first signaling comprises a first sub-signaling and a second sub-signaling, time-frequency resources occupied by the first sub-signaling belong to a first time-frequency resource set, time-frequency resources occupied by the second sub-signaling belong to a second time-frequency resource set, and the first time-frequency resource set and the second time-frequency resource set are respectively associated with a first candidate reference signal resource and a second candidate reference signal resource; time-frequency resources occupied by the second signaling belong to a third time-frequency resource set, and the third time-frequency resource set is associated with one of the first candidate reference signal resource or the second candidate reference signal resource.

In one subembodiment of the embodiment, the first candidate reference signal resource and the second candidate signal resource are non-QCL.

In one subembodiment of the embodiment, a radio signal transmitted in the first candidate reference signal resource and a radio signal transmitted in the second candidate signal resource are non-QCL.

In one subembodiment of the embodiment, the first sub-signaling and the second sub-signaling are two repetition transmissions for given DCI, and the first signaling is used to carry the given DCI.

In one subembodiment of the embodiment, the first time-frequency resource set is a COntrol REsource SET (CORESET).

In one subembodiment of the embodiment, the second time-frequency resource set is a CORESET.

In one subembodiment of the embodiment, the first time-frequency resource set is a Search Space.

In one subembodiment of the embodiment, the second time-frequency resource set is a Search Space.

In one subembodiment of the embodiment, the first time-frequency resource set is a Search Space Set.

In one subembodiment of the embodiment, the second time-frequency resource set is a Search Space Set.

In one subembodiment of the embodiment, the third time-frequency resource set is a CORESET.

In one subembodiment of the embodiment, the third time-frequency resource set is a Search Space.

In one subembodiment of the embodiment, the third time-frequency resource set is a Search Space Set.

In one subembodiment of the embodiment, the first candidate reference signal resource is associated with a TCI-State.

In one subembodiment of the embodiment, the first candidate reference signal resource is associated with a TCI-StateId.

In one subembodiment of the embodiment, the first candidate reference signal resource is associated with an SRI.

In one subembodiment of the embodiment, the first candidate reference signal resource comprises a CSI-RS resource.

In one subembodiment of the embodiment, the first candidate reference signal resource comprises an SSB.

In one subembodiment of the embodiment, the first candidate reference signal resource comprises an SRS.

In one subembodiment of the embodiment, the first candidate reference signal resource is associated with a CSI-RS resource identity.

In one subembodiment of the embodiment, the first candidate reference signal resource is indexed by an associated SSB.

In one subembodiment of the embodiment, the second candidate reference signal resource is associated with a TCI-State.

In one subembodiment of the embodiment, the second candidate reference signal resource is associated with a TCI-StateId.

In one subembodiment of the embodiment, the second candidate reference signal resource is associated with an SRI.

In one subembodiment of the embodiment, the second candidate reference signal resource comprises a CSI-RS resource.

In one subembodiment of the embodiment, the second candidate reference signal resource comprises an SSB.

In one subembodiment of the embodiment, the second candidate reference signal resource comprises an SRS.

In one subembodiment of the embodiment, the second candidate reference signal resource is associated with a CSI-RS resource identity.

In one subembodiment of the embodiment, the second candidate reference signal resource is indexed by an associated SSB.

In one subembodiment of the embodiment, the first candidate reference signal resource and the first reference signal resource are QCL.

In one subembodiment of the embodiment, the second candidate reference signal resource and the second reference signal resource are QCL.

In one subembodiment of the embodiment, a radio signal transmitted in the first time-frequency resource set and a radio signal transmitted in the first candidate reference signal resource are QCL.

In one subembodiment of the embodiment, a radio signal transmitted in the second time-frequency resource set and a radio signal transmitted in the second candidate reference signal resource are QCL.

In one subembodiment of the embodiment, the first node U1 adopts a same spatial reception parameter to receive a radio signal transmitted in the first time-frequency resource set and a radio signal transmitted in the first candidate reference signal.

In one subembodiment of the embodiment, the first node U1 adopts a same spatial reception parameter to receive a radio signal transmitted in the second time-frequency resource set and a radio signal transmitted in the second candidate reference signal.

In one subembodiment of the embodiment, a radio signal transmitted in the third time-frequency resource set and a radio signal transmitted in the first candidate reference signal resource are QCL, or a radio signal transmitted in the third time-frequency resource set and a radio signal transmitted in the second candidate reference signal resource are QCL.

In one embodiment, the K2 first-type time-domain resource subsets are reserved for transmitting K2 CBGs, and when the first reference signal resource and the second reference signal resource are QCL, one of the K2 CBGs is used to generate the second signal.

In one subembodiment of the embodiment, a given CBG is one of the K2 CBGs used to generate the second signal, and when there at least exists one CBG in (K2-1) CBG(s) other than the given CBG in K2 CBGs being dropped to be transmitted by the first node U1.

Embodiment 6

Figure 6:
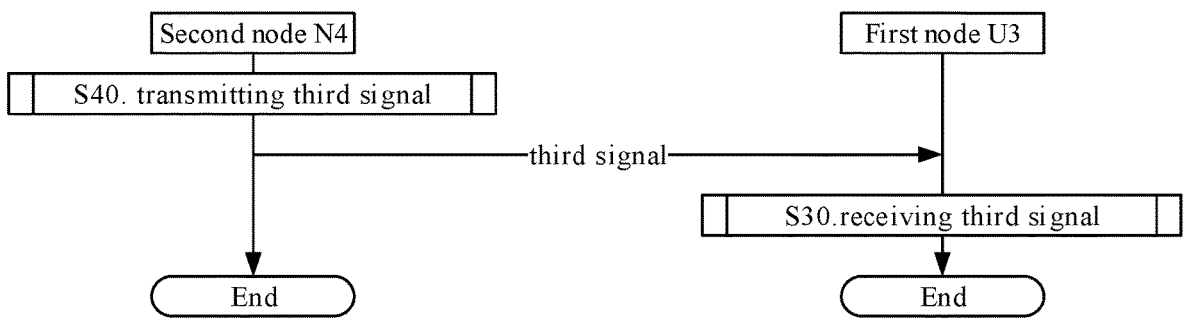
FIG. 6 illustrates a flowchart of a third signal according to one embodiment of the present disclosure.

Embodiment 6 illustrates a flowchart of a third signal, as shown in FIG. 6. In FIG. 6, a first node U3 and a second node N4 are in communications via a radio link. It is particularly underlined that the order illustrated in the embodiment does not put constraints over sequences of signal transmissions and implementations.

The first node U3 receives a third signal in step S30.

The second node N4 transmits a third signal in step S40.

In embodiment 6, the first signaling comprises a configuration information set of the third signal, and the first bit set comprises a feedback for the third signal.

In one embodiment, the step S30 is taken after the step S10 and before the step S11 in embodiment 5.

In one embodiment, the step S40 is taken after the step S20 and before the step S21 in embodiment 5.

In one embodiment, a physical layer channel bearing the third signal comprises a Physical Downlink Shared Channel (PDSCH).

In one embodiment, a transmission channel bearing the third signal comprises a Downlink Shared Channel (DL-SCH).

In one embodiment, the first signaling is used to schedule the third signal.

In one embodiment, the first signaling is used to trigger a measurement performed on the third signal.

In one embodiment, the first signaling is used to trigger a reporting performed on the third signal.

In one embodiment, a configuration information set of the third signal comprises at least one of time-domain resources or frequency-domain resources occupied by the third signal.

In one embodiment, a configuration information set of the third signal comprises a Modulation and Coding Scheme (MCS) adopted by the third signal.

In one embodiment, a configuration information set of the third signal comprises the adopted HARQ process number of the third signal.

In one embodiment, a configuration information set of the third signal comprises the adopted Redundancy Version (RV) of the third signal.

In one embodiment, the third signal comprises a CSI-RS.

In one embodiment, the feedback for the third signal comprises a HARQ-ACK of the third signal.

In one embodiment, the feedback for the third signal comprises a CSI obtained according to a measurement performed on the third signal.

In one embodiment, the third signal is a baseband signal.

In one embodiment, the third signal is a radio signal.

Embodiment 7

Figure 7:
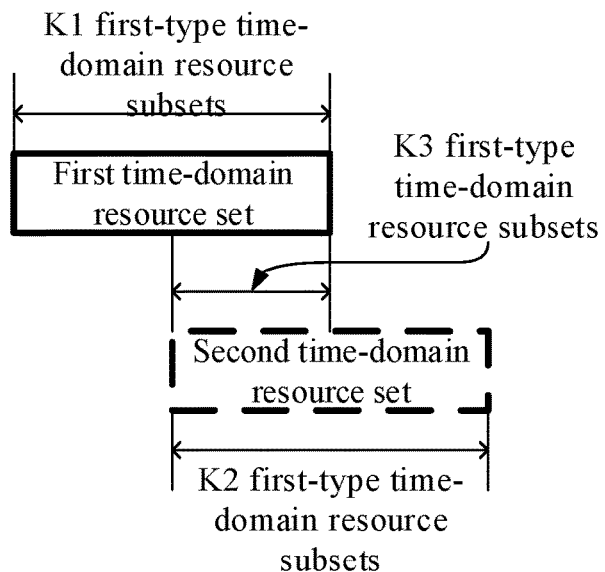
FIG. 7 illustrates a schematic diagram of a first time-domain resource set and a second time-domain resource set according to one embodiment of the present disclosure.

Embodiment 7 illustrates a schematic diagram of a first time-domain resource set and a second time-domain resource set, as shown in FIG. 7. In FIG. 7, the first time-domain resource set comprises K1 first-type time-domain resource subsets, the second time-domain resource set comprises K2 first-type time-domain resource subsets, and there are a total of K3 first-type time-domain resource subsets in the K1 first-type time-domain resource subsets and the K2 first-type time-domain resource subsets being overlapped, and K1, K2, and K3 are positive integers greater than 1.

In one embodiment, the K1 first-type time-domain resource subsets are consecutive in time domain.

In one embodiment, there at least exist two of the K1 first-type time-domain resource subsets adjacent in time domain being inconsecutive in time domain.

In one embodiment, the K2 first-type time-domain resource subsets are consecutive in time domain.

In one embodiment, there at least exist two of the K2 first-type time-domain resource subsets adjacent in time domain being inconsecutive in time domain.

In one embodiment, a duration of any two of the K1 first-type time-domain resource subsets in time domain is the same.

In one embodiment, there at least exists a duration of two of the K1 first-type time-domain resource subsets in time domain being different.

In one embodiment, a duration of any two of the K2 first-type time-domain resource subsets in time domain is the same.

In one embodiment, there at least exists a duration of two of the K2 first-type time-domain resource subsets in time domain being different.

In one embodiment, the first-type time-domain resource subset is one of slot, mini-slot or sub-slot.

In one embodiment, the K2 first-type time-domain resource subsets consist a slot.

Embodiment 8

Figure 8:
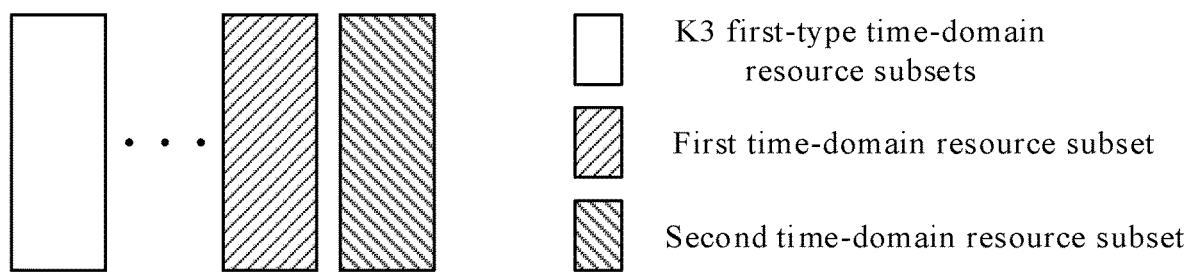
FIG. 8 illustrates a schematic diagram of a first time-domain resource subset and a second time-domain resource subset according to one embodiment of the present disclosure.

Embodiment 8 illustrates a schematic diagram of a first time-domain resource subset and a second time-domain resource subset, as shown in FIG. 8. In FIG. 8, the first time-domain resource subset and the second time-domain resource subset are respectively two orthogonal first-type time-domain resource subsets in time domain in K3 first-type time-domain resource subsets as shown in the figure.

In one embodiment, a number of OFDM symbols comprised in the first time-domain resource subset in time domain is the same as a number of OFDM symbols comprised in the second time-domain resource subset in time domain.

In one embodiment, the first time-domain resource subset and the second time-domain resource subset are respectively associated with two non-QCL reference signal resources when used for transmitting the first bit set.

In one embodiment, the first time-domain resource subset and the second time-domain resource subset are consecutive in time domain.

In one embodiment, the first time-domain resource subset and the second time-domain resource subset are discrete in time domain.

Embodiment 9

Figure 9:
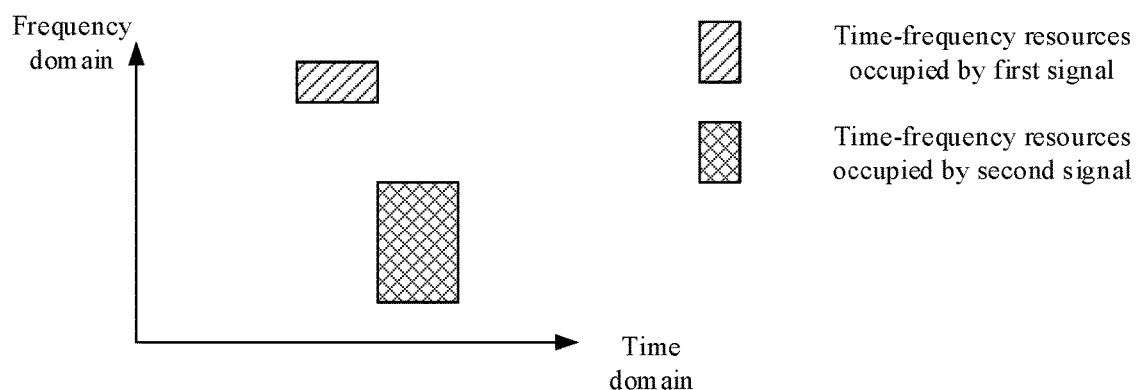
FIG. 9 illustrates a schematic diagram of a first signal and a second signal according to one embodiment of the present disclosure.

Embodiment 9 illustrates a schematic diagram of a first signal and a second signal, as shown in FIG. 9. In FIG. 9, the second bit block in the present disclosure is used to generate the second signal, time-frequency resources occupied by the first signal are indicated through the first signaling in the present disclosure, and time-frequency resources occupied by the second signal are indicated through the second signaling in the present disclosure.

In one embodiment, frequency-domain resources occupied by the first signal and frequency-domain resources occupied by the second signal are orthogonal in frequency domain.

In one embodiment, a number of Resource Blocks (RBs) occupied by the first signal is less than a number of RBs occupied by the second signal.

Embodiment 10

Figure 10:
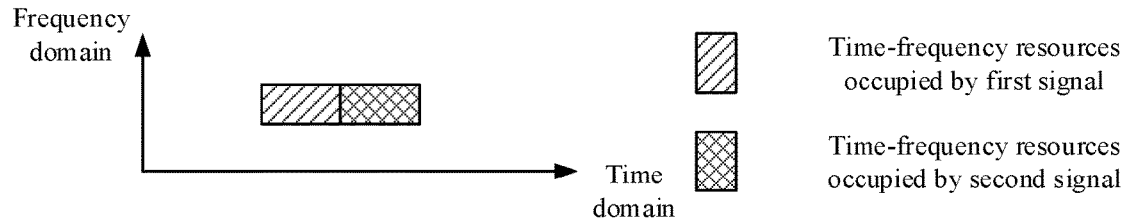
FIG. 10 illustrates a schematic diagram of a first signal and a second signal according to another embodiment of the present disclosure.

Embodiment 10 illustrates another schematic diagram of a first signal and a second signal, as shown in FIG. 10. In FIG. 10, the second bit block in the present disclosure is not used to generate the second signal, time-frequency resources occupied by the first signal are indicated through the first signaling in the present disclosure, and time-frequency resources occupied by the second signal are indicated through the first signaling in the present disclosure.

In one embodiment, frequency-domain resources occupied by the first signal and frequency-domain resources occupied by the second signal are overlapped in frequency domain.

In one embodiment, a number of RBs occupied by the first signal is the same as a number of RBs occupied by the second signal.

Embodiment 11

Figure 11:
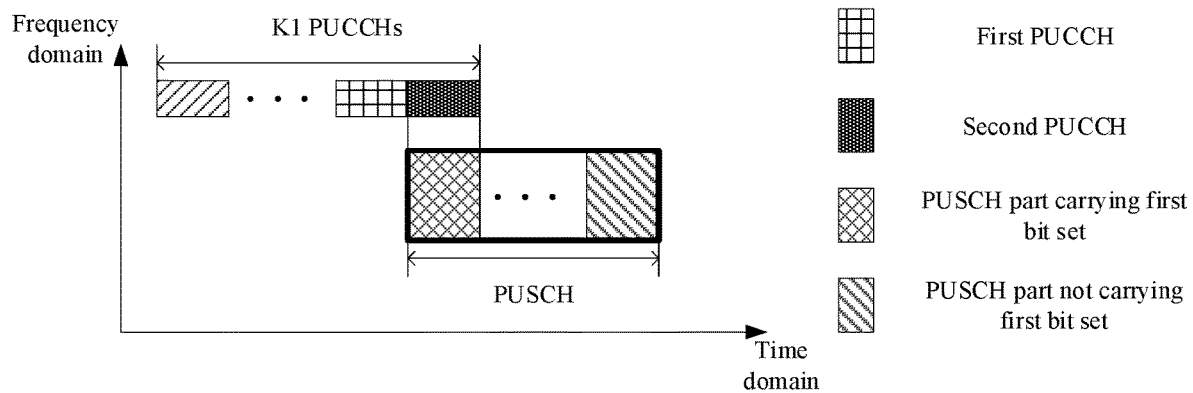
FIG. 11 illustrates a schematic diagram of K1 PUCCHs according to one embodiment of the present disclosure.

Embodiment 11 illustrates a schematic diagram of K1 PUCCHs, as shown in FIG. 11. In FIG. 11, the first signaling is used to indicate time-frequency resources occupied by K1 PUCCHs, and the K1 PUCCHs are used to carry a transmission of the first bit set in the present disclosure; the K1 PUCCHs comprise a first PUCCH and a second PUCCH, time-domain resources occupied by the first PUCCH are a first time-domain resource subset, and time-domain resources occupied by the second PUCCH are a second time-domain resource subset; the first PUCCH and a first reference signal resource are QCL, and the second PUCCH and a second signal resource are QCL; the second signaling is used to schedule a PUSCH, time-domain resources occupied by the PUSCH comprise K2 first-type time-domain resource subsets, and the K2 first-type time-domain resource subsets comprise a first time-domain resource subset and a second time-domain resource subset; the PUSCH and the second reference signal resource are QCL; the first node drops transmitting the second PUCCH, and the first node carries the first bit set through a part of the second signal located in the second time-domain resource subset.

In one embodiment, the K1 PUCCHs are K1 repetition transmissions.

Embodiment 12

Figure 12:
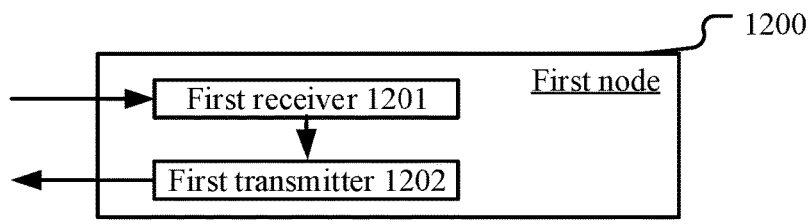
FIG. 12 illustrates a structure block diagram of a processing device in a first node according to one embodiment of the present disclosure.

Embodiment 12 illustrates a structure block diagram in a first node, as shown in FIG. 12. In FIG. 12, a first node 1200 comprises a first receiver 1201 and a first transmitter 1202.

The first receiver 1201 receives a first signaling and a second signaling; the first signaling is used to determine a first time-domain resource set, the second signaling is used to determine a second time-domain resource set; and the first transmitter 1202 transmits a first signal in a first time-domain resource subset, and transmits a second signal in a second time-domain resource subset;

in embodiment 12, the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are QCL is used to determine whether the second bit block is used to generate the second signal.

In one embodiment, when the first reference signal resource and the second reference signal resource are QCL, the second bit block is used to generate the second signal; and when the first reference signal resource and the second reference signal resource are not QCL, the second bit block is not used to generate the second signal.

In one embodiment, the first time-domain resource set comprises K1 first-type time-domain resource subsets, the second time-domain resource set comprises K2 first-type time-domain resource subsets, and there are a total of K3 first-type time-domain resource subsets in the K1 first-type time-domain resource subsets and the K2 first-type time-domain resource subsets being overlapped; the first time-domain resource subset and the second time-domain resource subset are respectively two different first-type time-domain resource subsets in the K3 first-type time-domain resource subsets; K1, K2 and K3 are positive integers greater than 1.

In one embodiment, the K1 first-type time-domain resource subsets are respectively reserved for K1 PUCCH repetition transmissions, and the first bit set is used to generate the K1 PUCCHs; the first signal is one PUCCH transmission in the K1 PUCCH repetition transmissions.

In one embodiment, when the first reference signal resource and the second reference signal resource are QCL, a physical layer channel bearing the second signal is a PUSCH, and an information bit carried by the first bit set is carried in the PUSCH; when the first reference signal resource and the second reference signal resource are not QCL, the second signal is one PUCCH transmission in the K1 PUCCH repetition transmissions.

In one embodiment, the first receiver 1201 receives a third signal; the first signaling comprises a configuration information set of the third signal, and the first bit set comprises a feedback for the third signal.

In one embodiment, the first signaling comprises a first sub-signaling and a second sub-signaling, time-frequency resources occupied by the first sub-signaling belong to a first time-frequency resource set, time-frequency resources occupied by the second sub-signaling belong to a second time-frequency resource set, and the first time-frequency resource set and the second time-frequency resource set are respectively associated with a first candidate reference signal resource and a second candidate reference signal resource; time-frequency resources occupied by the second signaling belong to a third time-frequency resource set, and the third time-frequency resource set is associated with one of the first candidate reference signal resource or the second candidate reference signal resource.

In one embodiment, the K2 first-type time-domain resource subsets are reserved for transmitting K2 CBGs, and when the first reference signal resource and the second reference signal resource are QCL, one of the K2 CBGs is used to generate the second signal.

In one embodiment, the first transmitter 1202 drops transmitting a bit comprised in the second bit block in the first time-domain resource subset.

In one embodiment, the first receiver 1201 comprises at least first four of the antenna 452, the receiver 454, the multi-antenna receiving processor 458, the receiving processor 456 and the controller/processor 459 in Embodiment 4.

In one embodiment, the first transmitter 1202 comprises at least the first four of the antenna 452, the transmitter 454, the multi-antenna transmitting processor 457, the transmitting processor 468 and the controller/processor 459 in embodiment 4.

Embodiment 13

Figure 13:
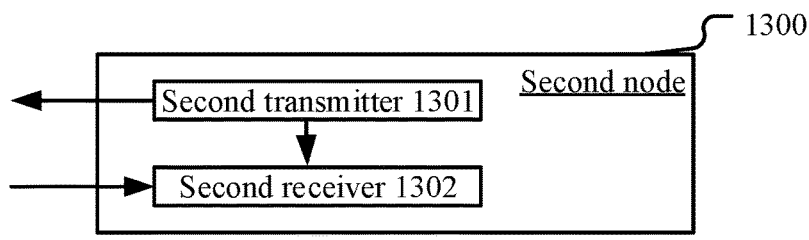
FIG. 13 illustrates a structure block diagram of a processing device in second node according to one embodiment of the present disclosure.

Embodiment 13 illustrates a structure block diagram of in a second node, as shown in FIG. 13. In FIG. 13, a second node 1300 comprises a second transmitter 1301 and a second receiver 1303.

The second transmitter 1301 transmits a first signaling and a second signaling; the first signaling is used to determine a first time-domain resource set, the second signaling is used to determine a second time-domain resource set; and the second receiver 1302 receives a first signal in a first time-domain resource subset, and receives a second signal in a second time-domain resource subset;

in embodiment 13, the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are QCL is used to determine whether the second bit block is used to generate the second signal.

In one embodiment, when the first reference signal resource and the second reference signal resource are QCL, the second bit block is used to generate the second signal; and when the first reference signal resource and the second reference signal resource are not QCL, the second bit block is not used to generate the second signal.

In one embodiment, the first time-domain resource set comprises K1 first-type time-domain resource subsets, the second time-domain resource set comprises K2 first-type time-domain resource subsets, and there are a total of K3 first-type time-domain resource subsets in the K1 first-type time-domain resource subsets and the K2 first-type time-domain resource subsets being overlapped; the first time-domain resource subset and the second time-domain resource subset are respectively two different first-type time-domain resource subsets in the K3 first-type time-domain resource subsets; K1, K2 and K3 are positive integers greater than 1.

In one embodiment, the K1 first-type time-domain resource subsets are respectively reserved for K1 PUCCH repetition transmissions, and the first bit set is used to generate the K1 PUCCHs; the first signal is one PUCCH transmission in the K1 PUCCH repetition transmissions.

In one embodiment, when the first reference signal resource and the second reference signal resource are QCL, a physical layer channel bearing the second signal is a PUSCH, and an information bit carried by the first bit set is carried in the PUSCH; when the first reference signal resource and the second reference signal resource are not QCL, the second signal is one PUCCH transmission in the K1 PUCCH repetition transmissions.

In one embodiment, the second transmitter 1301 transmits a third signal; the first signaling comprises a configuration information set of the third signal, and the first bit set comprises a feedback for the third signal.

In one embodiment, the first signaling comprises a first sub-signaling and a second sub-signaling, time-frequency resources occupied by the first sub-signaling belong to a first time-frequency resource set, time-frequency resources occupied by the second sub-signaling belong to a second time-frequency resource set, and the first time-frequency resource set and the second time-frequency resource set are respectively associated with a first candidate reference signal resource and a second candidate reference signal resource; time-frequency resources occupied by the second signaling belong to a third time-frequency resource set, and the third time-frequency resource set is associated with one of the first candidate reference signal resource or the second candidate reference signal resource.

In one embodiment, the K2 first-type time-domain resource subsets are reserved for transmitting K2 CBGs, and when the first reference signal resource and the second reference signal resource are QCL, one of the K2 CBGs is used to generate the second signal.

In one embodiment, the second receiver 1302 drops receiving a bit comprised in the second bit block in the first time-domain resource subset.

In one embodiment, the second transmitter 1301 comprises at least first four of the antenna 420, the transmitter 418, the multi-antenna transmitting processor 471, the transmitting processor 416 and the controller/processor 475 in Embodiment 4.

In one embodiment, the second receiver 1302 comprises at least the first four of the antenna 420, the receiver 418, the multi-antenna receiving processor 472, the receiving processor 470 and the controller/processor 475 in embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, cars, RSU, aircrafts, airplanes, Unmanned Aerial Vehicles (UAVs), telecontrolled aircrafts, etc. The second node in the present disclosure includes but is not limited to macro-cellular base stations, micro-cellular base stations, pico-cellular base stations, home base stations, relay base station, eNB, gNB, Transmitter Receiver Point (TRP), GNSS, relay satellites, satellite base stations, aerial base station, RSU, UAV, test devices, for example, a transceiver or a signaling tester simulating some functions of a base station, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
   a first receiver, receiving a first signaling and a second signaling; the first signaling being used to determine a first time-domain resource set, the second signaling being used to determine a second time-domain resource set; and
   a first transmitter, transmitting a first signal in a first time-domain resource subset, and transmitting a second signal in a second time-domain resource subset;
   wherein the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are Quasi Co-Located (QCL) is used to determine whether the second bit block is used to generate the second signal.

2. The first node according to claim 1, wherein when the first reference signal resource and the second reference signal resource are QCL, the second bit block is used to generate the second signal; and when the first reference signal resource and the second reference signal resource are not QCL, the second bit block is not used to generate the second signal.

3. The first node according to claim 1, wherein the first time-domain resource set comprises K1 first-type time-domain resource subsets, the second time-domain resource set comprises K2 first-type time-domain resource subsets, and there are a total of K3 first-type time-domain resource subsets in the K1 first-type time-domain resource subsets and the K2 first-type time-domain resource subsets being overlapped; the first time-domain resource subset and the second time-domain resource subset are respectively two different first-type time-domain resource subsets in the K3 first-type time-domain resource subsets; K1, K2 and K3 are positive integers greater than 1.

4. The first node according to claim 3, wherein the K1 first-type time-domain resource subsets are respectively reserved for K1 Physical Uplink Control Channel (PUCCH) repetition transmissions, and the first bit set is used to generate the K1 PUCCHs; the first signal is one PUCCH transmission in the K1 PUCCH repetition transmissions.

5. The first node according to claim 4, wherein when the first reference signal resource and the second reference signal resource are QCL, a physical layer channel bearing the second signal is a Physical Uplink Shared Channel (PUSCH), and an information bit carried by the first bit set is carried in the PUSCH; when the first reference signal resource and the second reference signal resource are not QCL, the second signal is one PUCCH transmission in the K1 PUCCH repetition transmissions.

6. The first node according to claim 1, wherein the first receiver receives a third signal; the first signaling comprises a configuration information set of the third signal, and the first bit set comprises a feedback for the third signal.

7. The first node according to claim 1, wherein the first signaling comprises a first sub-signaling and a second sub-signaling, time-frequency resources occupied by the first sub-signaling belong to a first time-frequency resource set, time-frequency resources occupied by the second sub-signaling belong to a second time-frequency resource set, and the first time-frequency resource set and the second time-frequency resource set are respectively associated with a first candidate reference signal resource and a second candidate reference signal resource; time-frequency resources occupied by the second signaling belong to a third time-frequency resource set, and the third time-frequency resource set is associated with one of the first candidate reference signal resource or the second candidate reference signal resource.

8. The first node according to claim 3, wherein the K2 first-type time-domain resource subsets are reserved for transmitting K2 Code Block Groups (CBGs), and when the first reference signal resource and the second reference signal resource are QCL, one of the K2 CBGs is used to generate the second signal.

9. The first node according to claim 1, wherein when the second bit block is used to generate the second signal, a physical layer signal bearing the second signal comprises a PUSCH, the second signal is one PUSCH transmission, or the second signal is one transmission of a plurality of PUSCH repetition transmissions; when the second bit block is not used to generate the second signal, a physical layer signal bearing the second signal comprises a PUCCH.

10. The first node according to claim 1, wherein the first bit set is used to carry Uplink Control Information (UCI), or the first bit set is used to generate UCI, or a bit comprised in the first bit set is an information bit carried by a piece of UCI.

11. The first node according to claim 1, wherein meanings of the above phrase of "the first time-domain resource subset being associated with a first reference signal resource" include one of the following:
    a radio signal transmitted by the first node in the first time-domain resource subset and the first reference signal resource are QCL;
    a radio signal received by the first node in the first time-domain resource subset and the first reference signal resource are QCL;
    a spatial reception parameter adopted by a radio signal received in the first reference signal resource is used to determine a spatial transmission parameter adopted by a radio signal transmitted by the first node in the first time-domain resource subset.

12. The first node according to claim 1, wherein a priority corresponding to the first signal is the same as a priority corresponding to the second signal.

13. The first node according to claim 1, wherein when the first reference signal resource and the second reference signal resource are QCL, the second bit block and the first bit set are used simultaneously to generate the second signal; when the first reference signal resource and the second reference signal resource are not QCL, only the first bit set in the second bit block and the first bit set is used to generate the second signal.

14. The first node according to claim 1, wherein when the first reference signal resource and the second reference signal resource are QCL, the second bit block is transmitted in only the second time-domain resource subset in the first time-domain resource subset and the second time-domain resource subset; when the first reference signal resource and the second reference signal resource are not QCL, the first node U1 drops transmitting partial or all bits comprised in the second bit block in the second time-domain resource set.

15. The first node according to claim 1, wherein when the first reference signal resource and the second reference signal resource are QCL, the second signaling is used to indicate frequency-domain resources occupied by the second signal; when the first reference signal resource and the second reference signal resource are not QCL, the first signaling is used to determine frequency-domain resources occupied by the second signal.

16. The first node according to claim 1, wherein the first reference signal resource is associated with a TCI-State, or the first reference signal resource is associated with a TCI-StateId, or the first reference signal resource is associated with an SRI.

17. The first node according to claim 1, wherein the second reference signal resource is associated with a TCI- State, or the second reference signal resource is associated with a TCI-StateId, or the second reference signal resource is associated with an SRI.

18. The first node according to claim 1, wherein the first reference signal resource comprises a CSI-RS resource, or the first reference signal resource comprises an SSB, or the first reference signal resource comprises an SRS resource; the second reference signal resource comprises a CSI-RS resource, or the second reference signal resource comprises an SSB, or the second reference signal resource comprises an SRS resource.

19. A second node for wireless communications, comprising:
  a second transmitter, transmitting a first signaling and a second signaling; the first signaling being used to determine a first time-domain resource set, the second signaling being used to determine a second time-domain resource set; and
  a second receiver, receiving a first signal in a first time-domain resource subset, and receiving a second signal in a second time-domain resource subset;
  wherein the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are Quasi Co-Located (QCL) is used to determine whether the second bit block is used to generate the second signal.

20. A method in a first node for wireless communications, comprising:
  receiving a first signaling and a second signaling; and the first signaling being used to determine a first time-domain resource set, the second signaling being used to determine a second time-domain resource set; and
  transmitting a first signal in a first time-domain resource subset, and transmitting a second signal in a second time-domain resource subset;
  wherein the first time-domain resource set comprises the first time-domain resource subset and the second time-domain resource subset; the second time-domain resource set comprises the first time-domain resource subset and the second time-domain resource subset, and the first time-domain resource subset is orthogonal to the second time-domain resource subset in time domain; the first time-domain resource set is reserved for transmitting a first bit set; the first bit set is used to generate the first signal; the first bit set is used to generate the second signal, the second signaling is used to schedule a second bit block, the first time-domain resource subset is associated with a first reference signal resource, and the second signaling is used to indicate a second reference signal resource; whether the first reference signal resource and the second reference signal resource are Quasi Co-Located (QCL) is used to determine whether the second bit block is used to generate the second signal.

* * * * *